United States Patent
Sparrer

(10) Patent No.: US 10,683,795 B2
(45) Date of Patent: Jun. 16, 2020

(54) TURBINE FOR AN EXHAUST TURBOCHARGER HAVING A DUAL BRANCH TURBINE HOUSING AND VALVE ARRANGEMENT FOR BRANCH CONNECTION AND WASTE GATE CONTROL

(71) Applicant: CONTINENTAL AUTOMOTIVE GMBH, Hannover (DE)

(72) Inventor: Christoph Sparrer, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 28 days.

(21) Appl. No.: 16/300,085

(22) PCT Filed: Apr. 20, 2017

(86) PCT No.: PCT/EP2017/059401
§ 371 (c)(1),
(2) Date: Nov. 9, 2018

(87) PCT Pub. No.: WO2017/194288
PCT Pub. Date: Nov. 16, 2017

(65) Prior Publication Data
US 2019/0153929 A1 May 23, 2019

(30) Foreign Application Priority Data
May 12, 2016 (DE) .................. 10 2016 208 158

(51) Int. Cl.
*F02B 37/02* (2006.01)
*F16K 1/20* (2006.01)
(Continued)

(52) U.S. Cl.
CPC .......... *F02B 37/025* (2013.01); *F01D 17/105* (2013.01); *F02B 37/183* (2013.01);
(Continued)

(58) Field of Classification Search
CPC .... F01D 17/105; F02B 37/025; F02B 37/183; F02B 37/186; F02B 37/225;
(Continued)

(56) References Cited

U.S. PATENT DOCUMENTS 5,046,317 A * 9/1991 Satokawa ............. F01D 17/105
60/602
5,673,559 A * 10/1997 Benson ................... F01D 9/026
415/144

(Continued)

FOREIGN PATENT DOCUMENTS

DE 102010008411 A1 8/2011
DE 102013002894 A1 9/2014
(Continued)

*Primary Examiner* — Jesse S Bogue
(74) *Attorney, Agent, or Firm* — Laurence A. Greenberg; Werner H. Stemer; Ralph E. Locher

(57) ABSTRACT

A turbine for an exhaust turbocharger has a dual branch turbine housing and valve arrangement for branch connection and waste gate control. The turbine for an exhaust-gas turbocharger, having a turbine housing which has two exhaust-gas volutes through which an exhaust gas mass flow can flow and between which there is provided a separating wall and having a linear valve which has a valve element and a displacement shaft. The displacement shaft is guided through the separating wall and is arranged movably in the direction of its shaft longitudinal axis in the separating wall. The displacement shaft and the valve element are separate components which are connected to one another such that a compensation of positional and dimensional tolerances between displacement shaft and valve element during operation is made possible.

10 Claims, 7 Drawing Sheets

(51) Int. Cl.
*F01D 17/10* (2006.01)
*F02B 37/18* (2006.01)
*F02B 37/22* (2006.01)
*F16K 1/48* (2006.01)
*F16K 11/052* (2006.01)

(52) U.S. Cl.
CPC .......... *F02B 37/186* (2013.01); *F02B 37/225* (2013.01); *F16K 1/2014* (2013.01); *F16K 1/48* (2013.01); *F16K 11/052* (2013.01); *F05D 2220/40* (2013.01); *F05D 2260/60* (2013.01); *Y02T 10/144* (2013.01)

(58) Field of Classification Search
CPC ............. F05D 2220/40; F05D 2260/60; F16K 11/052; F16K 1/2014; F16K 1/48; Y02T 10/144

See application file for complete search history.

(56) References Cited

U.S. PATENT DOCUMENTS

| | | | |
|---|---|---|---|
| 6,250,079 B1* | 6/2001 | Zander | F02B 37/025 60/602 |
| 6,269,643 B1* | 8/2001 | Schmidt | F02B 37/025 123/559.1 |
| 9,506,398 B2 | 11/2016 | Dusik et al. | |
| 9,726,081 B2 | 8/2017 | Zahoransky et al. | |
| 9,856,784 B2 | 1/2018 | Kronschnabl et al. | |
| 10,151,237 B2* | 12/2018 | McGahey | F02B 37/025 |
| 10,273,873 B2* | 4/2019 | Stilgenbauer | F02B 37/025 |
| 2014/0230432 A1 | 8/2014 | Kindl et al. | |
| 2017/0350312 A1* | 12/2017 | Karstadt | F02B 37/22 |
| 2019/0136752 A1* | 5/2019 | Burmester | F01D 17/105 |
| 2019/0178150 A1* | 6/2019 | Mehne | F01D 17/105 |

FOREIGN PATENT DOCUMENTS

| | | |
|---|---|---|
| DE | 202014009873 U1 | 4/2016 |
| WO | 2013135548 A1 | 9/2013 |
| WO | 2013139762 A1 | 9/2013 |
| WO | 2015009697 A1 | 1/2015 |
| WO | 2016094265 A1 | 6/2016 |

* cited by examiner

TURBINE FOR AN EXHAUST TURBOCHARGER HAVING A DUAL BRANCH TURBINE HOUSING AND VALVE ARRANGEMENT FOR BRANCH CONNECTION AND WASTE GATE CONTROL

BACKGROUND OF THE INVENTION

Field of the Invention

The invention relates to a turbine for an exhaust-gas turbocharger with a two-volute turbine housing and with a valve arrangement for volute connection and wastegate control.

An internal combustion engine 1 which is supercharged by an exhaust-gas turbocharger 2 is characterized by the arrangement of the guidance of fresh air and exhaust gases as illustrated in FIG. 1. During supercharged operation, the exhaust gas flows from the internal combustion engine 1 via the turbine 3, which drives the compressor 4 in the intake tract upstream of the inlet of the engine 1 via a common shaft 5. As a result of the compression of the intake air, more fuel can be admixed per cylinder stroke, and the torque of the engine 1 is increased.

For the sake of clarity, some elements of the air-guiding arrangement are not illustrated in FIG. 1. These are for example an air filter arranged upstream of the compressor, an air flow sensor arranged upstream of the compressor, a charge-air cooler arranged downstream of the compressor, a tank, a crankcase ventilation means arranged downstream of the throttle flap, and a catalytic converter arranged downstream of the turbine. An exhaust-gas recirculation arrangement that may be provided, or secondary air injection means, have likewise not been illustrated.

During supercharged operation, the throttle flap 8 is fully open. The closed-loop control of the supercharging may be effected for example by virtue of a part of the exhaust-gas mass flow being blown off through a wastegate system 7.

Furthermore, on the compressor side, there is arranged a so-called overrun air recirculation system 6, via which excess compressed intake air can be blown off and recirculated into the intake tract.

FIG. 2 illustrates a possible embodiment of an exhaust-gas turbocharger 2 according to the prior art. This illustration includes a section in the region of the wastegate system. Said wastegate system 7 is arranged in the turbine housing 9. The wastegate system is actuated by means of a wastegate actuator 10 which is fastened to the compressor housing 11 using a holder. Between the turbine housing 9 and the compressor housing 11, there is situated a bearing assembly 12 in which the common rotor shaft of turbine wheel and compressor wheel is accommodated.

FIG. 3 shows the wastegate system 7 in a plan view and in a sectional illustration of the side view. The illustration shows the wastegate opening 13 in the turbine housing 9, which can be opened up or closed off by means of a flap disk 14. Thus, a part of the exhaust-gas mass flow can be conducted past the turbine impeller. The opening and closing actuation of the flap disk 14 is performed by means of a linear movement of a control rod 15 which is driven in a manner controlled by a pneumatic or electric wastegate actuator. This linear movement is transmitted via a connecting plate 16 to an outer wastegate lever 17. The wastegate spindle 19 mounted in a bushing 18 transmits the rotational movement via the pivot arm 19a to the flap disk 14. Owing to the linearly guided control rod 15, a compensation joint 20 is additionally required in the kinematic arrangement in order to ensure a compensation of an offset.

The above embodiments relate to exhaust-gas turbochargers with a single-volute turbine housing, which has only one exhaust-gas supply channel, a so-called exhaust-gas volute, which is arranged in spiral fashion around the turbine impeller 9c. Corresponding exhaust-gas turbines are also referred to as monoscroll turbines. This technology has the disadvantage that the charge exchange, that is to say the exchange of exhaust gas and fuel-gas mixture, of the individual cylinders of the internal combustion engine during operation can have a mutually adverse effect owing to the pulsating exhaust-gas back pressure. This has an adverse effect on the charging of the cylinders of the engine with fuel-gas mixture, whereby, in turn, the consumption, response behavior and nominal power thereof are impaired.

To eliminate or at least alleviate this problem, use may be made of two-volute or multi-volute turbine housings which correspondingly have two or more mutually separate exhaust-gas volutes. Here, a distinction is made between segmented-scroll turbine housings 9a and twin-scroll turbine housings 9b, as illustrated in FIG. 4.

Both turbines comprise a separating wall 21, which is provided between the two exhaust-gas volutes 22 and 23. In the case of the segmented-scroll turbine housing 9a, the separating wall 21 is arranged such that the turbine impeller 9c is impinged on from both exhaust-gas volutes 22, 23 over in each case 180° over the full impeller inlet width. In the case of the twin-scroll turbine housing 9b, the separating wall 21 is arranged in the radial direction with respect to the turbine impeller 9c, whereby said turbine impeller is impinged on from both exhaust-gas volutes 22, 23 over 360° over a fraction, for example in each case 50%, of the impeller inlet width. In both turbine construction types, use is made, as can be seen from FIG. 5, of an exhaust-gas manifold 24 in which, in the case of four-cylinder engines, in each case two cylinders, and in the case of six-cylinder engines, in each case three cylinders, are combined to form a tract. Each tract is in turn connected to one exhaust-gas volute of the two-volute turbine housing. It is ensured in this way that the pulsating exhaust-gas mass flows of the individual cylinders have the least possible adverse effect on one another.

FIG. 5 illustrates the exhaust-gas manifold of a four-cylinder engine, in the case of which in each case two exhaust-gas lines of the respective cylinders are combined to form a tract. Thus, the exhaust-gas lines 26 and 29 of the first and of the fourth cylinder are combined to form a tract. Furthermore, the exhaust-gas lines 27 and 28 of the second and of the third cylinder are combined to form a tract. The arrows shown are intended to illustrate the respective mutually separate exhaust-gas mass flows 25.

As in the case of monoscroll turbines, closed-loop charge-pressure control is realized in the case of exhaust-gas turbochargers with two-volute turbine housings by virtue of excess exhaust gases being blown off via a wastegate system. For a further reduction of the charge-exchange losses in the case of exhaust-gas turbochargers with two-volute turbine housings, a volute connection between the separated exhaust-gas volutes which is switchable or controllable in open-loop or closed-fashion has proven to be advantageous. As in the case of the wastegate system, this involves a valve arrangement which permits a transfer flow of exhaust gas between the exhaust-gas volutes as required. The use of a second valve however has an adverse effect on the costs and the structural space of the exhaust-gas turbocharger.

To avoid these disadvantages, it is already known for the functionalities of wastegate system and volute connection to be realized using a single valve arrangement.

One possible embodiment of a wastegate system 7 of said type for a two-volute turbine housing 9 is illustrated in FIG. 6. Said figure shows the two exhaust-gas volutes 22 and 23 of the turbine housing 9 and the two wastegate outlets 32, 33 and the outlet chamber 31. Both the exhaust-gas volutes 22, 23 and the wastegate outlets 32, 33 are separated from one another by a separating wall 21. It is thus possible for both exhaust-gas volutes to be actuated by means of a common flap disk 14, wherein, when the two wastegate outlets 32, 33 are open, the two exhaust-gas volutes 22 and 23 are simultaneously also fluidically connected to one another. For the displacement of the flap disk 14, a pivot arm 19a is provided, which is actuated in rotation by means of the wastegate spindle 19. Such a valve arrangement may also be referred to as a pivot arm flap valve. The main function of this embodiment is closed-loop control of the wastegate mass flow of both exhaust-gas volutes using one valve arrangement.

DE 10 2013 002 894 A1 has disclosed a turbine for an exhaust-gas turbocharger, which turbine has a turbine housing in which two volutes through which exhaust gas can flow are provided, which turbine housing furthermore has a bypass channel. Furthermore, a valve is provided which, in the closed state, shuts off both the volute connection and the bypass channel and, in the open state, opens both the volute connection and the bypass channel. This valve is also designed as a pivot arm flap valve and is movable in rotation. It has a pivot arm which is pivotable about a center of rotation and to the end region of which there is fastened a flap disk, which is supplemented by a spherical-segment-shaped valve body which projects into the valve opening.

In the case of such a rotationally pivotable pivot arm flap valve being used, which simultaneously acts as a valve element for actuating the wastegate valve and the volute connection, there is limited freedom for the design of the valve body. This will be discussed on the basis of FIGS. 7 and 8, which illustrate the movement of a valve body 36. From these figures, it is clear that the movement of the valve body 36 is limited by a circle (illustrated by dashed lines). Consequently, the outer contour of the valve body 36 must be selected such that the valve body 36, during its movement, does not cross the circular line toward the outside. This has the disadvantage, for example, that the shape of the valve body 36 cannot be freely selected, and for example cannot be cylindrical.

Furthermore, DE 10 2010 008 411 A1 has disclosed an exhaust-gas turbine for an exhaust-gas turbocharger, which exhaust-gas turbine has a turbine housing which has two exhaust-gas volutes, through which exhaust gas can flow, and has a bypass. Between the exhaust-gas volutes and the bypass, there is provided a valve arrangement which is adjustable in translational fashion, that is to say linearly along an axis, which arrangement can also be referred to as linear valve. In this specific case, the illustrated linear valve has, as a valve element, a shaft, a pot-shaped cover and a flap disk. In a first position of this linear valve, the exhaust-gas volutes are fluidically separated from one another, and the bypass is closed. In a second position of this linear valve, the exhaust-gas volutes are fluidically connected to one another, and the bypass is closed. In a third position of this linear valve, the exhaust-gas volutes are fluidically connected to one another, and the bypass is open.

SUMMARY OF THE INVENTION

It is the object of the invention to specify a turbine for an exhaust-gas turbocharger having a two-volute turbine housing and having a valve arrangement designed as a linear valve, the functionality of which is ensured even in the presence of large temperature fluctuations that occur during operation.

This object is achieved by means of a turbine having the features as claimed. Advantageous embodiments and refinements of the invention are specified in the dependent claims.

According to the invention, a turbine for an exhaust-gas turbocharger is proposed, having a turbine housing which has two exhaust-gas volutes through which an exhaust gas can flow and between which there is provided a separating wall and which have a common wastegate opening. Furthermore, the turbine has only one linear valve which has a valve element, for opening and closing the wastegate opening in the direction of a common outlet chamber arranged outside the exhaust-gas volutes, and a displacement shaft, with a shaft longitudinal axis, for actuating the valve element. Here, and below, the expression "linear valve" is to be understood to mean a valve which is in particular characterized in that the valve element predefines a rectilinear translational actuating movement.

The turbine according to the invention is characterized in that the displacement shaft is guided through the separating wall out of the turbine housing in the direction of a separating wall plane spanned by the separating wall, and is arranged movably in the direction of its shaft longitudinal axis (that is to say linearly or translationally along the shaft longitudinal axis) in the separating wall, and in that the displacement shaft and the valve element are separate components which are connected to one another at a connecting point such that a compensation of positional and dimensional tolerances between displacement shaft, valve element and wastegate opening during operation is made possible.

Here, for the compensation of positional and dimensional tolerances, the connection between valve element and displacement shaft may easily be designed with sufficient play, or else may have an articulated connection, such as for example a ball head bearing or a cardan joint.

The advantages of a turbine having the features as claimed consist in particular in that, during the operation of the turbine, owing to the guidance of the displacement shaft of the linear valve in the separating wall between the two exhaust-gas volutes, exact guidance of the displacement shaft is ensured. By means of this exact guidance of the displacement shaft of the valve within the separating wall between the two exhaust-gas volutes, it is ensured that, for example, the valve disk of the valve element, in a first valve position, lies exactly on its seat at the outlet of the wastegate opening, such that the exhaust-gas volutes are reliably and completely fluidically separated from one another, and that, in the second valve position, the valve is fully open. A further advantage of the invention consists in a reduced space requirement, because guidance of the displacement shaft is possible at least partially within the separating wall, which is provided in any case in two-volute turbines, of the turbine housing. The above-stated advantages are achieved even in the presence of high temperatures and even in the presence of large temperature differences in the turbine housing, because, owing to the connection according to the invention of the valve element to the displacement shaft, thermally induced deformations of the turbine housing or thermally induced distortion of the turbine housing and of the valve arrangement are compensated. Further advantageous refinements and embodiments of a turbine having the features according to the invention, will emerge from the following description of exemplary embodiments of the invention on the basis of FIGS. 9 to 12.

Items of identical function and designation are denoted by the same reference designations throughout the figures. The illustrated subjects are to be understood as examples of various embodiments or refinements thereof, and are not intended to rule out further alternative designs in accordance with the definition of the claims.

DESCRIPTION OF THE INVENTION

Figure 9:
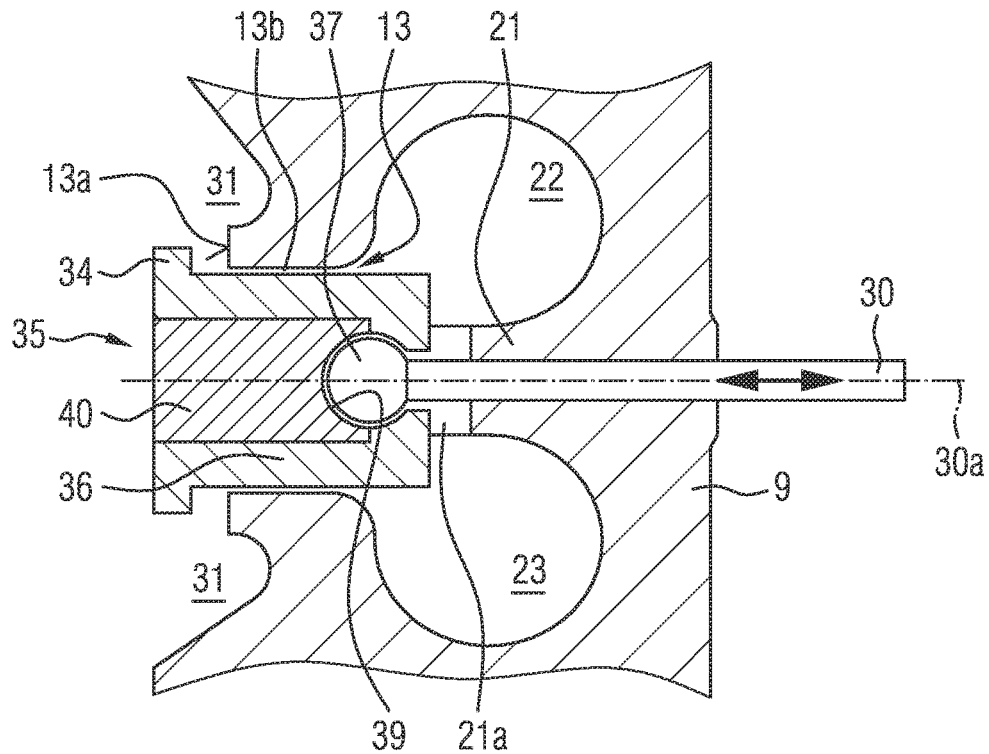
FIG. 9 shows a detail of the turbine housing in a sectional illustration for the purposes of illustrating a first exemplary embodiment of a turbine according to the invention.

FIG. 9 shows a detail of the turbine housing in a sectional illustration for the purposes of illustrating a first exemplary embodiment.

In this first exemplary embodiment, two exhaust-gas volutes 22 and 23 through which an exhaust-gas mass flow can pass are provided in the turbine housing 9. A separating wall 21 is situated between these two exhaust-gas volutes. Furthermore, the turbine housing 9 has an outlet chamber 31 through which, when the wastegate opening is open, a part of the exhaust-gas mass flow is discharged. Furthermore, in the exemplary embodiment shown, a linear valve with a valve element 35 is provided.

The valve element 35 is, in order to close the wastegate opening 13, guided from the direction of the outlet chamber 31 toward a valve seat 13a and can, in order to open the wastegate opening 13, be lifted off from the valve seat in the axial direction of the shaft longitudinal axis 30a into the outlet chamber 31 by means of the displacement shaft 30.

This linear valve includes a valve element 35 and a displacement shaft 30 with a shaft longitudinal axis 30a. The valve element 35 has a valve disk 34 and has a valve body 36 which is connected fixedly to said valve disk, and in the present case is formed monolithically in one piece with the valve disk 34, wherein the valve disk 34 is, in order to close the wastegate opening 13 by sealed abutment of the valve disk 34 on the valve seat 13a surrounding the wastegate opening 13, guided from the direction of the outlet chamber 31 toward the valve seat 13a.

Furthermore, the linear valve has a displacement shaft 30 which is realized as a separate component and which is guided through the separating wall 21 out of the turbine housing 9 in a separating wall plane spanned by the separating wall 21 at this location, and which is arranged so as to be guided movably in its longitudinal direction, that is to say in its axial direction, within said separating wall 21, as the bidirectional arrow in FIG. 9 is intended to illustrate.

Here, the connecting point of the displacement shaft 30 to the valve element 35 is arranged in the region of the wastegate opening 13 of the turbine housing 9, wherein the displacement shaft 30 is equipped, in its end region facing toward the valve element 35, with a ball head 37 which is mounted movably and possibly with play in a receiving opening 39 of the valve body 36. The degree of mobility and possibly the play of the mounting is in this case dimensioned so as to permit a compensation of positional and dimensional tolerances between displacement shaft 30, valve element 35 and the valve seat 12a of the wastegate opening 13 during operation, that is to say in particular even in the presence of greatly increased and fluctuating temperatures. For this purpose, in that end region of the valve body 36 which is averted from the displacement shaft 30, there is provided a receiving opening 39 into which a closure element 40 is inserted. The closure element 40 and the valve body 36 have apertures which collectively form a ball socket in which the ball head 37 of the displacement shaft 30 is mounted, possibly with play.

During the installation of the linear valve into the turbine housing 9, it is firstly the case that the displacement shaft 30, the termination of which forms the ball head 37, is inserted from left to right in the figure into the receiving opening 39 of the valve body 36, and is then pushed through the bore running in the separating wall 21 in the separating wall plane. At a later time, the receiving opening 39 of the valve body 36 is then closed off, for example by virtue of the closure element 40 being pressed into the receiving opening 39.

By means of this connection, which exhibits a certain degree of mobility, of the displacement shaft 30 to the valve element 35, which is composed of valve body 36 and valve disk 34, which are fixedly connected to one another or form a monolithic, single-piece structural unit, thermally induced deformations or distortion of the turbine housing 9 and of the valve arrangement that occur during the operation of the exhaust-gas turbocharger can be compensated. This is advantageous in particular if large differences exist between the temperature of the turbine housing in the region of the separating wall 21 and the temperature of the turbine housing in the region of the wastegate opening 13 and in particular in the region of the valve seat 13a of the wastegate opening 13, because in this case, the turbine housing may be deformed with different intensity, or may be distorted with different intensity, in these regions.

In the exemplary embodiment shown in FIG. 9, the fluidic connection of the two exhaust-gas volutes 22, 23 and the opening-up of the wastegate opening 13 of the wastegate system is effected not by rotational movement using a flap attached to a pivot arm but rather by translational, that is to say linear, movement using a linear valve. Here, the displacement shaft 30 of this linear valve is guided, centrally with respect to the wastegate opening 13, in the separating wall 21 between the two exhaust-gas volutes 22, 23. The bore in the separating wall 21, through which bore the displacement shaft 30 is guided, preferably runs, in a separating wall plane which is spanned by the separating wall 21 at this location, centrally in and through the separating wall 21 (that is to say not transversely or perpendicularly with respect to the separating wall plane).

The valve body 36 is preferably of cylindrical design and has a slightly smaller diameter than the wastegate opening 13 in which it is arranged. This is made possible in particular by the linear, translational opening stroke of the linear valve. This cylindrical design is particularly advantageous because, during an opening of the linear valve, when firstly the valve disk 34 lifts off from the valve seat 13a, initially only a predefined small wastegate cross section, in the form of a ring-shaped gap 13b between valve body 36 and wastegate opening 13a, is opened up. During a further opening of the linear valve, the open-up wastegate cross section initially remains constant owing to the unchanging ring-shaped gap 13b between the wastegate opening of the turbine housing 9 and the valve body 36. Only when the valve body 36 has been pushed all the way out of the wastegate opening of the turbine housing 9 is the opened-up wastegate cross section increased in size. Other geometries, for example conical, cone-shaped or hemispherical, of the valve body 36 may also be used here, which yield a different opening characteristic of the wastegate cross section over the linear opening stroke of the valve element 35.

In the closed position of the valve element 35, the valve body 36 is arranged in a separating wall aperture 21a. This separating wall aperture 21a constitutes, in an open position of the valve element 35, a connection between the exhaust-gas volutes 22, 23. In the closed position of the valve element 35, when the valve body 36 lies sealingly in the base of the separating wall aperture 21a, the separating wall aperture 21a is blocked by the valve body 36, and the two exhaust-gas volutes 22, 23 are fluidically separated from one another. During the opening of the linear valve, the valve body 36 lifts off from the base of the separating wall aperture 21a, and with progressive opening opens up an increasingly larger volute connecting cross section. Here, the enlargement of the area of the volute connecting cross section occurs for example with a linear rise over the opening stroke of the valve element 35 of the linear valve.

The use of a linear valve gives rise to further advantages, which consist in reduced costs owing to the use of fewer individual parts and fewer joining processes, a reduced structural space requirement, and a greater degree of freedom with regard to the design of the valve body.

Figure 10:
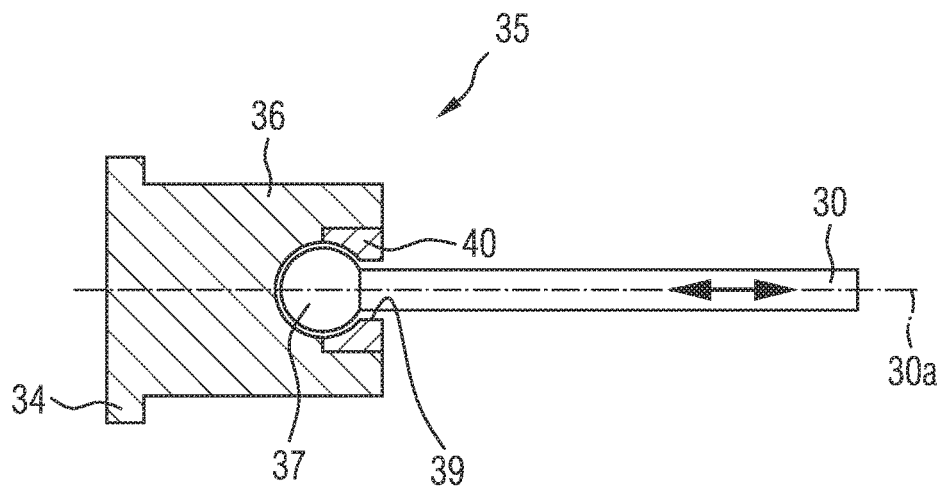
FIG. 10 shows a valve arrangement in a sectional illustration for the purposes of illustrating a further exemplary embodiment with a valve element which has a valve disk and a valve body.

FIG. 10 shows a valve arrangement in a sectional illustration for illustrating a further exemplary embodiment with a valve element which has a valve disk and a valve body and which can be used instead of the valve arrangement shown in FIG. 9.

The linear valve illustrated in FIG. 10 includes a valve element 35 with a valve disk 34 and with a valve body 36 which is fixedly connected to or formed monolithically in one piece with said valve disk. Furthermore, the linear valve has a displacement shaft 30 which is realized as a separate component and which is arranged in the separating wall 21 of the turbine housing 9 in the same way as described with regard to FIG. 9 and which is guided movably in its longitudinal direction within said separating wall, as the bidirectional arrow in FIG. 10 is intended to illustrate.

The displacement shaft 30 is equipped, in its end region facing toward the valve element 35, with a ball head 37, which is mounted movably in a receiving opening 39 of the valve body 36. For this purpose, in that end region of the valve body 36 which faces toward the displacement shaft 30, there is provided a receiving opening 39 into which a closure element 40 is inserted. The closure element 40 and the valve body 36 have apertures which collectively form a ball socket which serves for receiving the ball head 37 of the displacement shaft 30 and in which the ball head 37 of the displacement shaft 33 is mounted so as to be movable to a limited extent, possibly with play.

During the installation of the valve arrangement into the turbine housing 9, it is firstly the case that the displacement shaft 30, the termination of which forms the ball head 37, is pushed through the bore of the intermediate wall 21. Subsequently, the valve body 36 including the valve disk 34 is pushed onto the ball head 37, and finally, the receiving opening 39 is closed by means of the closure element 40, which, already before the insertion of the displacement shaft 30 through the bore of the separating wall 21, has been placed loosely around the displacement shaft 30. This closure of the receiving opening 39 is performed for example by virtue of the closure element 40 being pressed into the receiving opening 39. This is performed such that, when the closure element 40 has been pressed in, there is nevertheless at least such a degree of play between the displacement shaft 33, the termination of which forms the ball head 37, and the valve body 36 both in the axial direction of the displacement shaft 30 and in the radial direction of the displacement shaft 30 that the de-sired mobility of the connection is ensured.

By means of this movable connection, possibly with play, of the displacement shaft 30 to the valve element 35, thermally induced deformations or distortion of the turbine housing 9 that occur during the operation of the exhaust-gas turbocharger can be compensated. This is advantageous in particular if large differences exist between the temperature of the turbine housing in the region of the separating wall 21 and the temperature of the turbine housing in the region of the wastegate opening 13 and in particular in the region of the valve seat 13a of the wastegate opening 13, because in this case, the turbine housing may be deformed with different intensity, or may be distorted with different intensity, in these regions.

Figure 11:
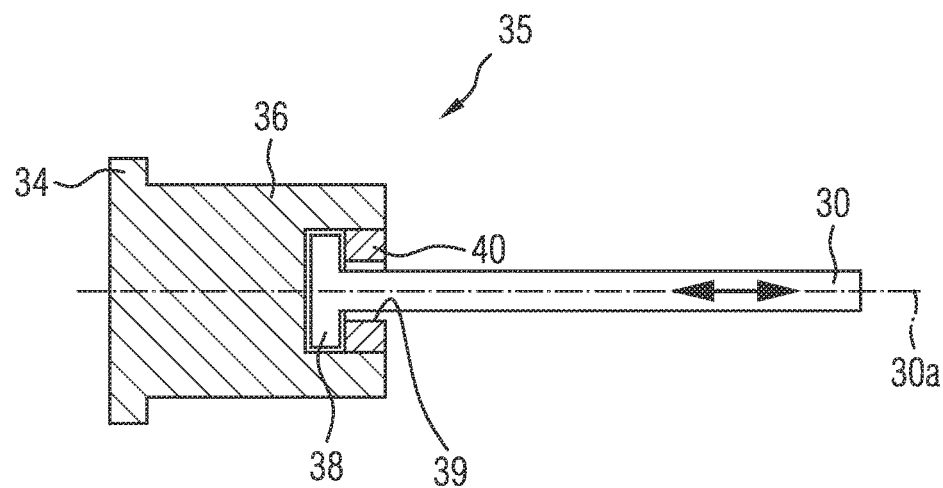
FIG. 11 shows a valve arrangement in a sectional illustration for the purposes of illustrating a further exemplary embodiment with a valve element which has a valve disk and a valve body.

FIG. 11 shows a valve arrangement in a sectional illustration for the purposes of illustrating a further exemplary embodiment with a valve element which has a valve disk and a valve body.

The linear valve illustrated in FIG. 11 includes a valve element 35 which has a valve disk 34 and a valve body 36 which is fixedly connected to or formed monolithically in one piece with said valve disk. Furthermore, the linear valve has a displacement shaft 30 which is realized as a separate component and which is arranged in the separating wall 21 of the turbine housing 9 in the same way as described with regard to FIG. 9 and which is guided in translationally, linearly movable fashion in its longitudinal direction within said separating wall, as the bidirectional arrow in FIG. 11 is intended to illustrate.

The displacement shaft 30 is equipped, in its end region facing toward the valve element 35, with a disk head 38, which is mounted with play in a receiving opening 39 of the valve body 36. Here, the disk head 38 refers to a disk-shaped radial widening of the end region of the displacement shaft 30. For the connection of the displacement shaft 30 to the valve element 35, in that end region of the valve body 36 which faces toward the displacement shaft 30, there is provided a receiving opening 39, into which the disk head 38 and a closure element 40 are inserted, wherein the disk head 38, including that region of the displacement shaft 30 which adjoins it, is mounted with play in the receiving opening 39 between the valve body 36 and the closure element 40. This play exists both in the axial direction of the displacement shaft 30 and in the radial direction of the displacement shaft 30 and is dimensioned such that the valve body 35 is movable relative to the displacement shaft 30 to such an extent that a compensation of positional and dimensional tolerances between displacement shaft 30, valve element 35 and wastegate opening 13 during operation is made possible.

During the installation of the valve arrangement into the turbine housing 9, the procedure is the same as has already been described with regard to the exemplary embodiment of FIG. 10. In this case, too, this is performed such that, when the closure element 40 has been pressed in, there is nevertheless mobility between the disk head 38 of the displacement shaft 30 and the valve body 36 both in the axial direction of the displacement shaft 30 and in the radial direction of the displacement shaft 30 which is adequate for the compensation of tolerances.

By means of this connection, which is movable owing to corresponding play, of the displacement shaft 30 to the valve element 35, thermally induced deformations or distortion of the turbine housing 9 that occur during the operation of the exhaust-gas turbocharger can be compensated. This is advantageous in particular if large differences exist between the temperature of the turbine housing in the region of the separating wall 21 and the temperature of the turbine housing in the region of the wastegate opening 13 and in particular in the region of the valve seat 13a of the wastegate opening 13, because in this case, the turbine housing may be deformed with different intensity, or may be distorted with different intensity, in these regions.

Figure 1:
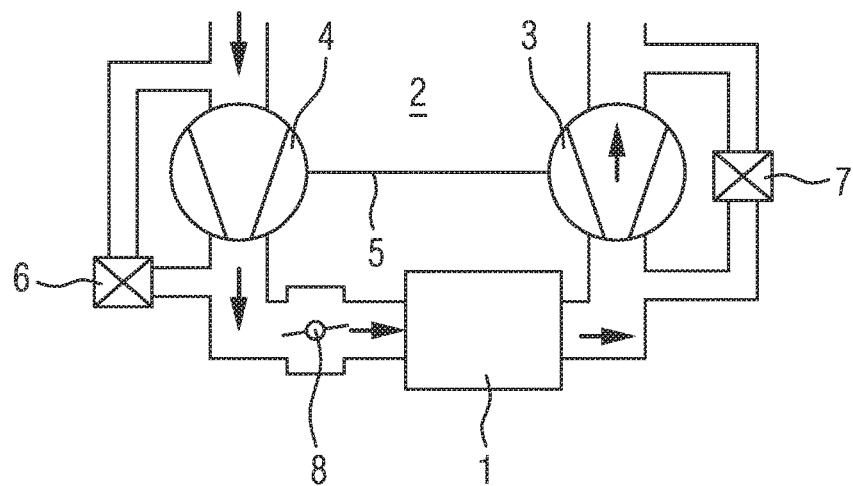
FIG. 1 shows a schematic diagram of an internal combustion engine with an exhaust gas turbine arrangement.
Figure 2:
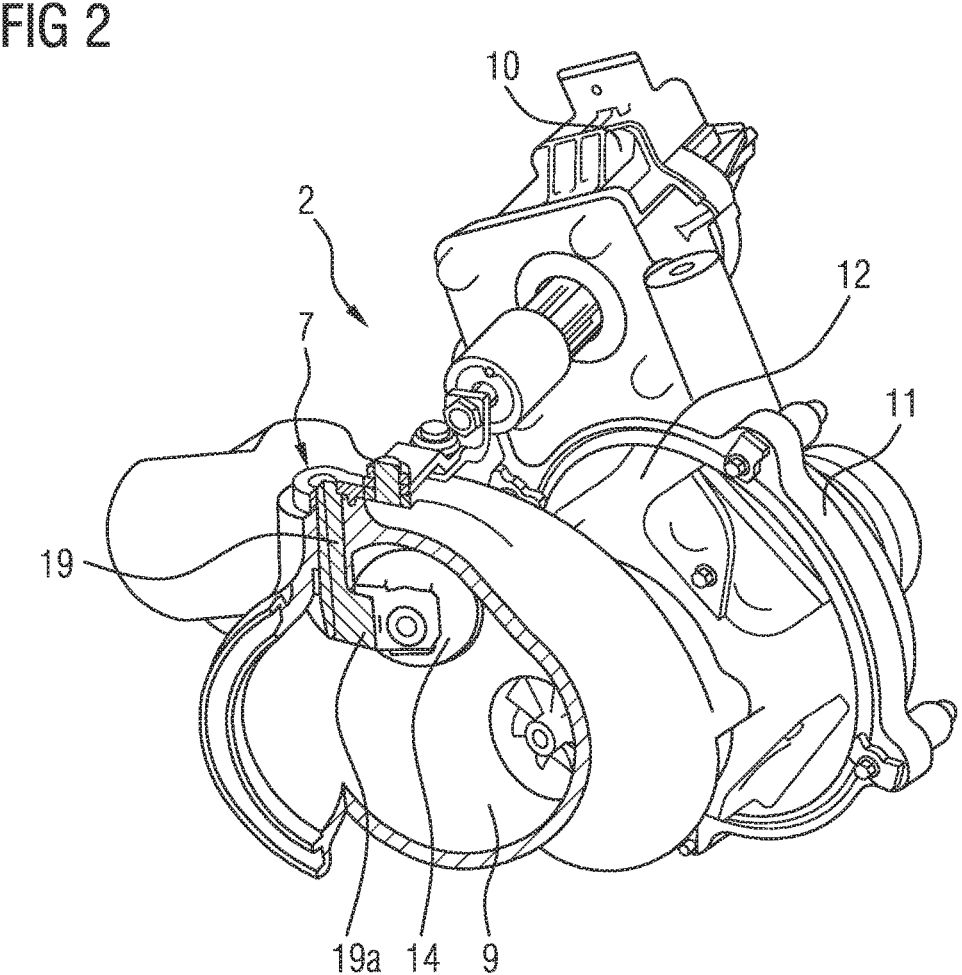
FIGS. 2-8 show various details of the exhaust gas turbine.
Figure 3:
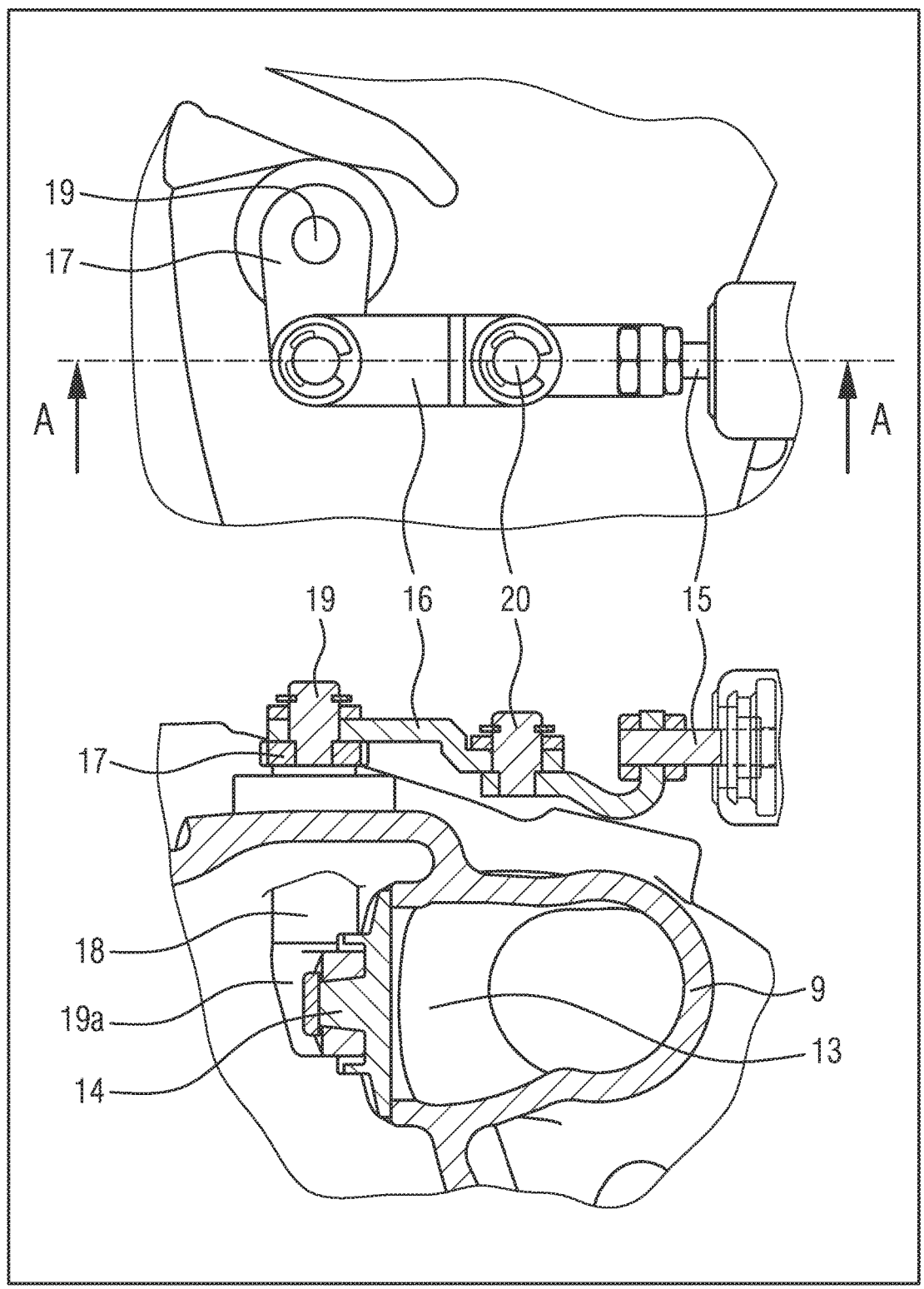
Figure 4:
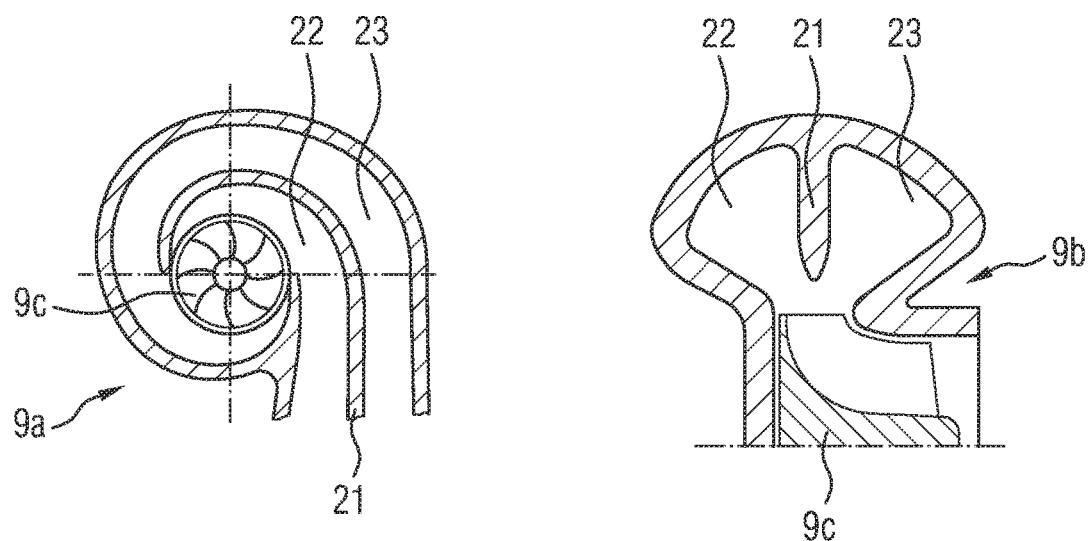
Figure 5:
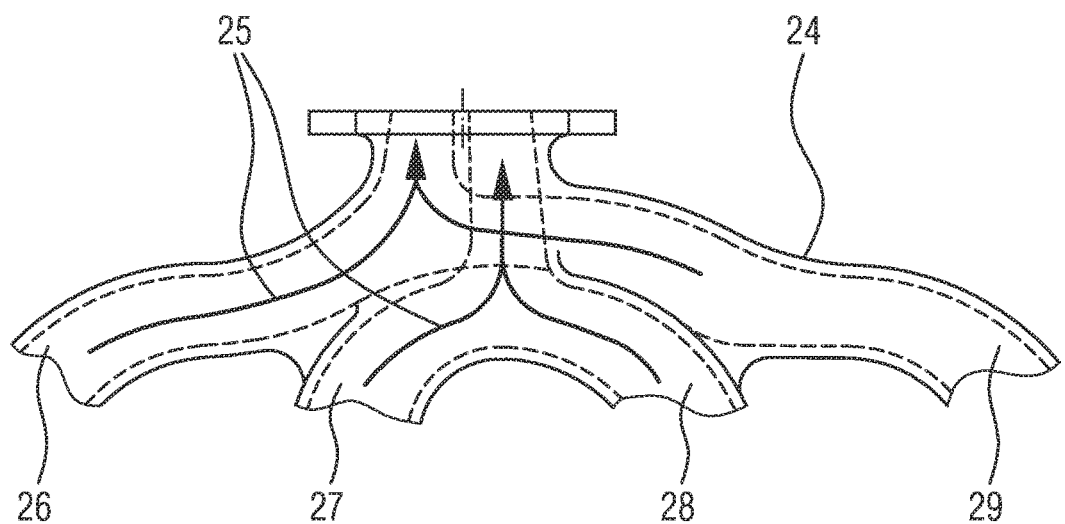
Figure 6:
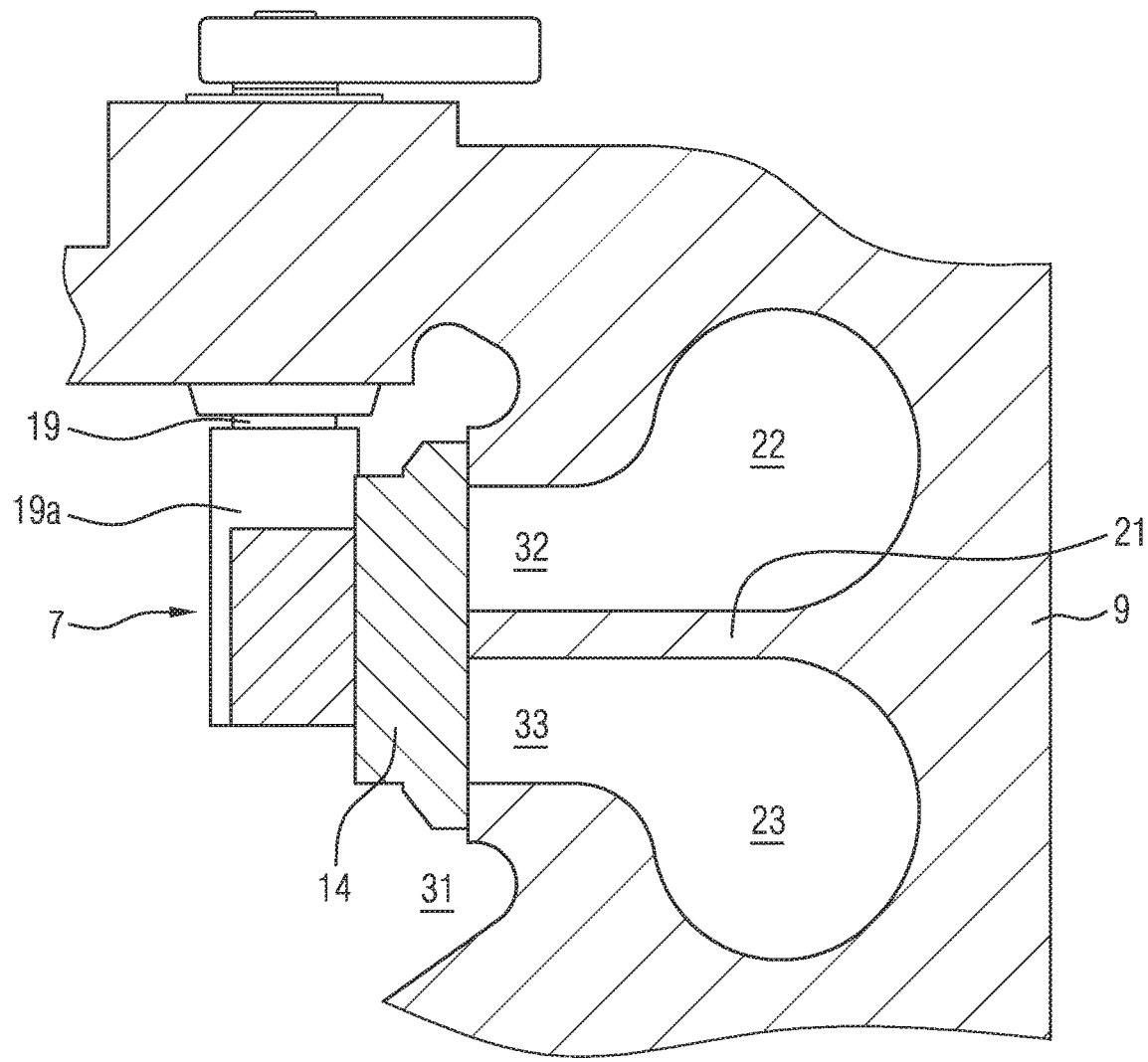
Figure 7:
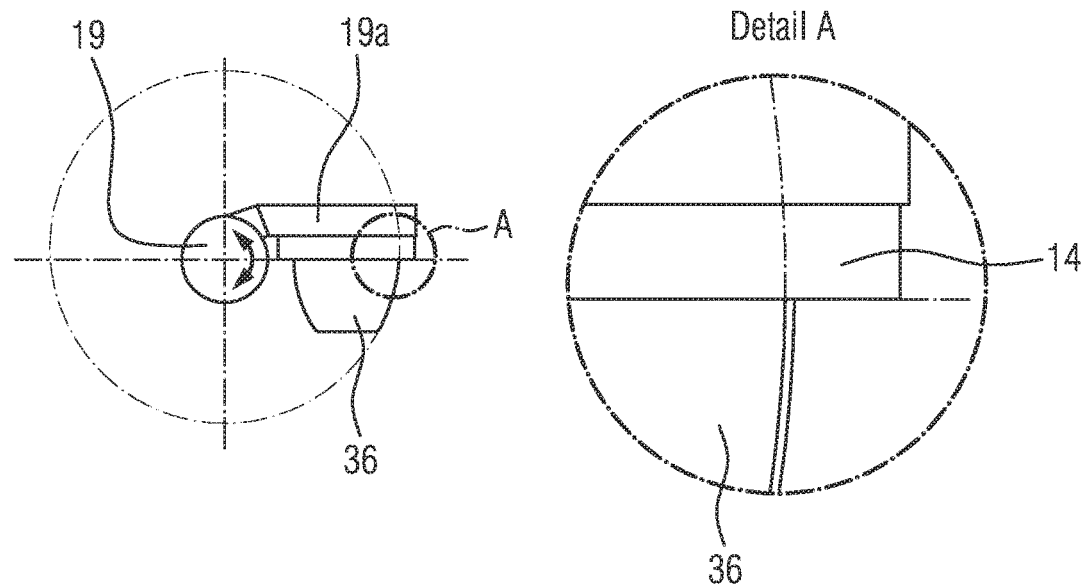
Figure 8:
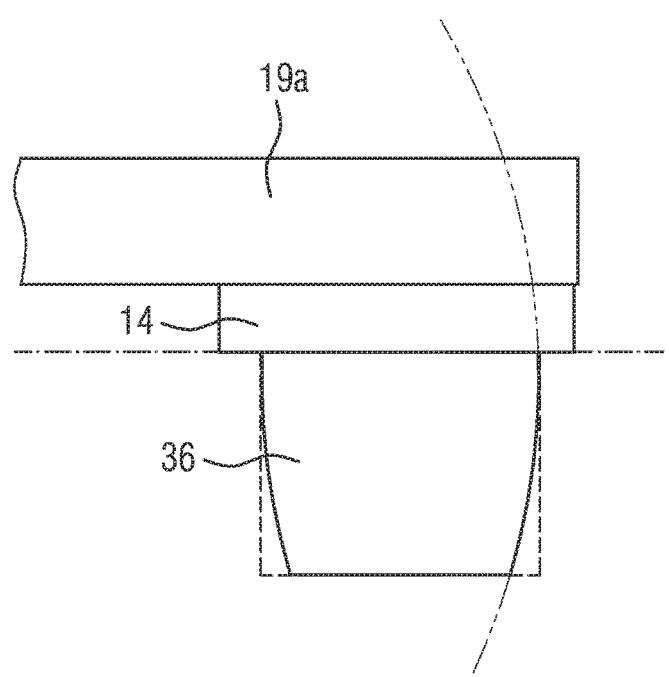
Figure 12:
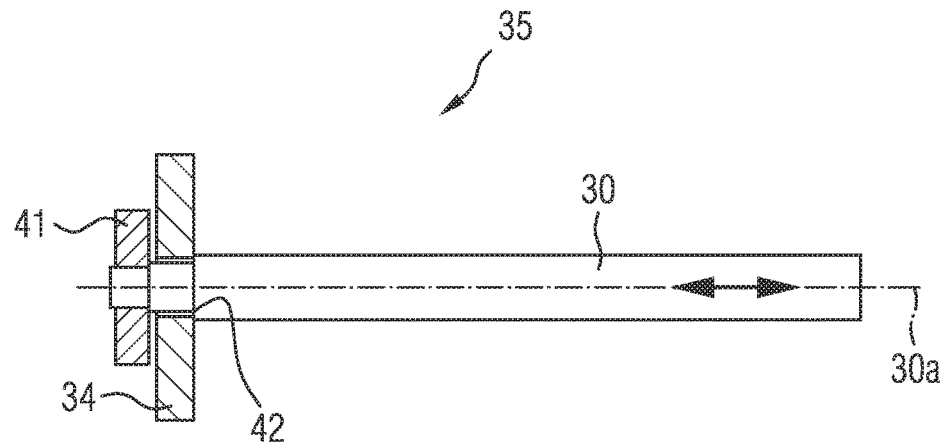
FIG. 12 shows a valve arrangement in a sectional illustration for the purposes of illustrating a further exemplary embodiment with a valve element in the form of a valve disk.

FIG. 12 shows a valve arrangement in a sectional illustration for the purposes of illustrating a further very simple exemplary embodiment with a valve element designed as a valve disk 34, which, in a similar manner to the valve arrangement shown in FIG. 6, may be used instead of the pivot arm flap valve.

The valve arrangement illustrated in FIG. 12 includes a valve disk 34 and a displacement shaft 30 which is realized as a separate component and which, in the same way as exemplary embodiments illustrated in the examples of FIGS. 9 and 11, is arranged in the separating wall 21 of the turbine housing 9 and is guided out of the turbine housing 9 and is guided movably in its longitudinal direction within said separating wall, as the bidirectional arrow in FIG. 12 illustrates.

The embodiment shown in FIG. 12 is characterized in that the displacement shaft 30, in its end region formed in this case merely as a valve disk 34 and facing toward the valve element, has a step 42 and a terminating element 41 fixedly connected to the displacement shaft 30, wherein the valve element formed as a valve disk 34 is mounted between the terminating element 41 and the step 42 of the displacement shaft 30 so as to exhibit play in a radial direction and an axial direction of the displacement shaft 30. Said terminating element 41 is for example a riveted disk. In that axial region of the displacement shaft 30 in which the valve disk 34 is positioned, the displacement shaft 30 is of narrowed form such that a step 42 is formed in the transition region to this narrowed region. In this narrow region of the displacement shaft 30, the valve disk 34 is mounted with play between the displacement shaft 30 and the terminating element 41, wherein this play exists both in the axial direction of the displacement shaft 30 and in the radial direction of the displacement shaft 30.

By means of this connection, with play, of the displacement shaft 30 to the valve disk 34, it is possible for thermally induced deformations or distortion of the turbine housing 9 that occur during operation of the exhaust-gas turbocharger to be compensated, such that, when the linear valve is closed, the valve disk 34 always comes to bear in a flat and sealing manner against the valve seat 13a of the wastegate opening 13.

The invention claimed is:

1. A turbine for an exhaust-gas turbocharger, the turbine comprising:

a turbine housing having two exhaust-gas volutes for an exhaust gas flow, a separating wall between said two exhaust-gas volutes, and a common wastegate opening;

a single linear valve having a valve element for selectively opening and closing said wastegate opening towards a common outlet chamber arranged outside said exhaust-gas volutes, and having a displacement shaft, with a shaft longitudinal axis, for actuating said valve element;

said displacement shaft extending through said separating wall out of said turbine housing in the direction of a separating wall plane spanned by said separating wall and being disposed to be movably guided in a direction of said shaft longitudinal axis in said separating wall; and said displacement shaft and said valve element being separate components that are connected to one another at a connecting point which enables a compensation of positional and dimensional tolerances between said displacement shaft, said valve element and said wastegate opening during an operation of the turbine.

2. The turbine according to claim 1, wherein, in order to close said wastegate opening, said valve element is guided away from the outlet chamber toward a valve seat and, in order to open the wastegate opening, is lifted off the valve seat in an axial direction of said shaft longitudinal axis into the outlet chamber by said displacement shaft.

3. The turbine according to claim 1, wherein said connecting point between said displacement shaft to said valve element is arranged in a region of said wastegate opening of said turbine housing.

4. The turbine according to claim 1, wherein said valve element comprises a valve disk and a valve body connected to said valve disk and disposed between said displacement shaft and said valve disk, wherein said valve disk, in order to close said wastegate opening by sealed abutment of said valve disk on the valve seat surrounding said wastegate opening, is guided away from the outlet chamber toward the valve seat, and said connecting point of said displacement shaft is arranged with said valve element in said valve body.

5. The turbine according to claim 4, wherein said valve disk and said valve body are combined in a component formed in one piece.

6. The turbine according to claim 4, wherein said displacement shaft, in an end region thereof facing toward said valve element, has a ball head or a disk head which is mounted movably in a corresponding receiving opening formed in said valve body.

7. The turbine according to claim 6, further comprising a closure element disposed to close off said receiving opening of said valve body.

8. The turbine according to claim 7, wherein said closure element is arranged in an end region, averted from said displacement shaft, of said valve body.

9. The turbine according to claim 7, wherein said closure element is positioned in an end region, facing toward said displacement shaft, of said valve body.

10. The turbine according to claim 1, wherein said displacement shaft, in an end region thereof facing toward said valve element, has a step and a terminating element fixedly connected to said displacement shaft, wherein a valve element formed as a valve disk is mounted between said terminating element and said step so as to exhibit play in a radial direction and an axial direction of said displacement shaft.

* * * * *